United States Patent Office 2,993,865
Patented July 25, 1961

2,993,865
CORROSION INHIBITORS FOR ALUMINUM
Roger F. Monroe and Fred J. Lowes, Midland, Mich., assignors to The Dow Chemical Company, Midland, Mich., a corporation of Delaware
No Drawing. Filed Aug. 2, 1956, Ser. No. 601,642
9 Claims. (Cl. 252—148)

This invention relates to corrosion inhibitors for use in aqueous hydrochloric acid to inhibit the corrosion of aluminum exposed to the acid.

The inhibitors of this invention are 1-ethynylcyclohexyl compounds having the formula

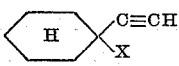

wherein X is —OH, —OCOCH$_3$, —OCH$_2$CHOHCH$_3$ or —NH$_2$, in combination with dioxane.

According to the invention, the ethynylcyclohexyl compound and the dioxane are simply dissolved in the aqueous hydrochloric acid the corrosive action of which is to be inhibited. By the term "aqueous hydrochloric acid" we mean any solution of hydrogen chloride which also contains a significant amount of water and do not mean to exclude the presence of other substances.

Only small amounts of the inhibitor combination are needed. As little as 0.1 percent of each constituent provided adequate inhibition for many applications, though larger amounts up to about 2 percent of each constituent give correspondingly better protection. Amounts in excess of about 2 percent give little added protection.

While the ratio of ethynylcyclohexyl compound to dioxane is not critical, best results are obtained when the two are used in approximately equal amounts. However, because of the lower cost of dioxane, it is usually more economical to use a somewhat larger percentage of it than of the ethynylcyclohexyl compound.

Applications in which the inhibitors of the invention are useful include acid metal-cleaning, pickling, etching and polishing baths in which aluminum parts are exposed to the acid. A particular field of utility is in acid solutions used in removing lime and plaster from aluminum glazed windows such as are commonly used on greenhouses. While the inhibitors show some activity against other non-oxidizing acids, they are particularly effective in the presence of hydrochloric acid and it is to this particular application that the present invention is directed.

The new ethynylcyclohexyl compounds used in this invention and methods for their preparation are more fully described in our copending applications filed August 2, 1956, Serial Nos. 601,649, now U.S. Patent No. 2,802,878, and 601,654, now abandoned.

The ethynylcyclohexanol and acetate may be prepared as described in British Patent 737,080. The ethynylcyclohexyl 2-hydroxypropyl ether may be obtained by the reaction of propylene oxide on 1-ethynylcyclohexanol. 1-ethynylcyclohexylamine may be made by treating the corresponding chloride with ammonia or concentrated aqueous ammonium hydroxide. The chloride, in turn, may be made from the alcohol by treatment with concentrated hydrochloric acid.

The unique synergistic effect of our ethynylcyclohexyl compounds and dioxane in protecting aluminum from corrosion by aqueous hydrochloric acid is illustrated by the results obtained in a series of tests wherein aluminum bars 3″ x 1″ x ⅜″ were suspended with two-thirds of their length immersed in 70 cc. of 5 percent aqueous hydrochloric acid and the weight loss due to corrosion determined. Some typical results thus obtained are shown in Table I.

TABLE I
Corrosion of aluminum by 5 percent HCl containing various inhibitors

| Example | Inhibitor [a] | Exposure Time | Wt. Loss, g. |
|---|---|---|---|
| 1 | none | 4 hr | 1.2 |
| 2 | Dioxane | 4 hr | 1.1 |
| 3 | 1-Ethynylcyclohexanol | 5 days | .82 |
| 4 | Dioxane / 1-Ethynylcyclohexanol | do | .22 |
| 5 | Dioxane / 1-Ethynylcyclohexylamine | 1 day | .16 |
| 6 | Dioxane / 1-Ethynylcyclohexyl-2-Hydroxypropyl Ether | do | .40 |
| 7 | Dioxane / 1-Ethynylcyclohexyl Acetate | do | .63 |

[a] All inhibitors were used at a concentration of 0.25 g. in 70 cc. of acid solution.

As may be seen from the data in the above table, 1-ethynylcyclohexanol is by far the most effective of the ethynylcyclohexyl cxompounds and is a fair inhibitor even in the absence of dioxane. Its effectiveness is greatly increased by the presence of dioxane, however. The other ethynylcyclohexyl compounds are substantially devoid of inhibitory effect in the absence of dioxane and are only moderately effective with it.

Results generally paralleling those shown in the above table are obtained when other concentrations of acid or inhibitors are used. High concentrations of acid attack aluminum so vigorously, however, that even when the best inhibitors are used, substantial corrosion occurs during any prolonged exposure.

While the ethynylcyclohexyl compound and the dioxane used as inhibitors in our invention may be kept separate and added separately to the acid solution to be inhibited, it is generally more convenient to mix the two and thus obtain a homogeneous, stable, liquid inhibitor composition that can be stored, shipped and used as a single composition. In use, the desired amount of this inhibitor composition is simply mixed with the acid solution to be inhibited.

We claim:

1. A composition for inhibiting the corrosion of aluminum by aqueous hydrochloric acid comprising dioxane and an ethynylcyclohexyl compound having the formula

wherein X is a radical selected from the group consisting of —OH, —OCOCH$_3$, —OCH$_2$CHOHCH$_3$ and —NH$_2$.

2. A composition for inhibiting the corrosion of aluminum by aqueous hydrochloric acid comprising dioxane and 1-ethynylcyclohexanol.

3. A composition for inhibiting the corrosion of aluminum by aqueous hydrochloric acid comprising dioxane and 1-ethynylcyclohexyl acetate.

4. A composition for inhibiting the corrosion of aluminum by aqueous hydrochloric acid comprising dioxane and 1-ethynylcyclohexyl 2-hydroxypropyl ether.

5. A composition for inhibiting the corrosion of aluminum by aqueous hydrochloric acid comprising dioxane and 1-ethynylcyclohexylamine.

6. A process for inhibiting the corrosion of aluminum by aqueous hydrochloric acid in contact therewith comprising maintaining in said acid a concentration of about 0.1 to 2 percent, by weight, of a corrosion inhibitor consisting essentially of a mixture of dioxane and an ethynylcyclohexyl compound having the formula

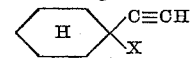

wherein X is a radical selected from the group consisting of —OH, —OCOCH$_3$, —OCH$_2$CHOHCH$_3$ and —NH$_2$.

7. Aqueous hydrochloric acid containing, as a corrosion inhibitor for the protection of aluminum in contact with said acid, an effective amount of a mixture of dioxane and an ethynylcyclohexyl compound having the formula

wherein X is a radical selected from the group consisting of —OH, —OCOCH$_3$, —OCH$_2$CHOHCH$_3$ and —NH$_2$.

8. A composition as defined in claim 7 wherein the ethynylcyclohexyl compound is 1-ethynylcyclohexanol.

9. A composition as defined in claim 7 wherein the corrosion inhibitor constitutes about 0.1 to 2 percent, by weight, of the aqueous acid.

References Cited in the file of this patent

UNITED STATES PATENTS

| | | |
|---|---|---|
| 1,169,341 | Chrzesciuski et al. | Jan. 25, 1916 |
| 1,841,768 | Straus et al. | Jan. 19, 1932 |
| 1,963,934 | Carothers et al. | June 19, 1934 |
| 2,152,406 | Ducamp et al. | Mar. 28, 1939 |
| 2,204,597 | Humphreys et al. | June 18, 1940 |
| 2,250,445 | Bruson et al. | July 29, 1941 |
| 2,355,599 | Walker | Aug. 8, 1944 |
| 2,371,644 | Petering et al. | Mar. 20, 1945 |
| 2,407,149 | Gardenier | Sept. 3, 1946 |
| 2,603,622 | Berger et al. | July 15, 1952 |
| 2,726,269 | Humphlett | Dec. 6, 1955 |
| 2,775,624 | Skeeters et al. | Dec. 25, 1956 |
| 2,775,626 | Schaaf et al. | Dec. 25, 1956 |
| 2,805,257 | Lowes et al. | Sept. 3, 1957 |
| 2,806,067 | Monroe et al. | Sept. 10, 1957 |
| 2,814,593 | Beiswanger et al. | Nov. 26, 1957 |
| 2,838,458 | Bachtel | June 10, 1958 |
| 2,880,180 | Foster et al. | Mar. 31, 1959 |

FOREIGN PATENTS

| | | |
|---|---|---|
| 627,453 | Great Britain | Aug. 9, 1949 |
| 890,796 | Germany | Sept. 21, 1953 |
| 505,421 | Belgium | Sept. 15, 1951 |
| 1,075,385 | France | Apr. 14, 1954 |
| 1,079,916 | France | May 26, 1954 |

OTHER REFERENCES

Corrosion Handbook by Uhlig, pp. 910–912, pub. by John Wiley, N.Y., 1948.

Acetylenic Compounds by Johnson, vol. I, acetylenic alcohols, pages 11, 141, 282, 286, pub. by Edward Arnold & Co., London (1946).